United States Patent
Wilfert et al.

[11] 3,726,559
[45] Apr. 10, 1973

[54] MOTOR VEHICLE BODY

[75] Inventors: Karl Wilfert, Gerlingen-Waldstadt; Béla Barényi, Wurttemberg, both of Germany

[73] Assignee: Daimler-Benz Aktiengesellschaft, Stuttgart-Untertuerkheim, Germany

[22] Filed: Mar. 8, 1971

[21] Appl. No.: 121,930

[30] Foreign Application Priority Data

Mar. 7, 1970 Germany....................P 20 10 913.1

[52] U.S. Cl......................296/28 R, 49/483, 296/146
[51] Int. Cl.................................................B60j 5/04
[58] Field of Search................296/28 R, 28 F, 28 H, 296/146, 151; 49/470, 483, 489, 490, 491

[56] References Cited

UNITED STATES PATENTS

| | | | |
|---|---|---|---|
| 2,114,344 | 4/1938 | Haberstump | 296/28 R |
| 2,482,906 | 9/1949 | Goodwin et al | 296/28 R |
| 1,902,499 | 3/1933 | Herreshoff | 49/483 X |
| 2,260,129 | 10/1941 | Wetzel | 296/28 R |
| 2,833,589 | 5/1958 | Ahrens | 296/28 R |
| 3,031,224 | 4/1962 | Komenda et al | 296/28 R |
| 3,179,987 | 4/1965 | Banzet | 49/489 X |
| 2,976,584 | 3/1961 | Ghormley | 49/470 |
| 2,724,877 | 11/1955 | Ramsay | 49/491 |
| 2,821,429 | 1/1958 | Rantala | 296/28 R |

*Primary Examiner*—Benjamin Hersh
*Assistant Examiner*—Leslie J. Paperner
*Attorney*—Craig, Antonelli, Stewart & Hill

[57] ABSTRACT

A motor vehicle body, in particular for passenger motor vehicles which are equipped with lateral doors and with longitudinal threshold bearers disposed below the doors; the upper area of the outer lateral surface of a longitudinal threshold bearer projects considerably beyond the lower area in the outward direction and is covered at least in part by the door.

28 Claims, 3 Drawing Figures

PATENTED APR 10 1973 3,726,559
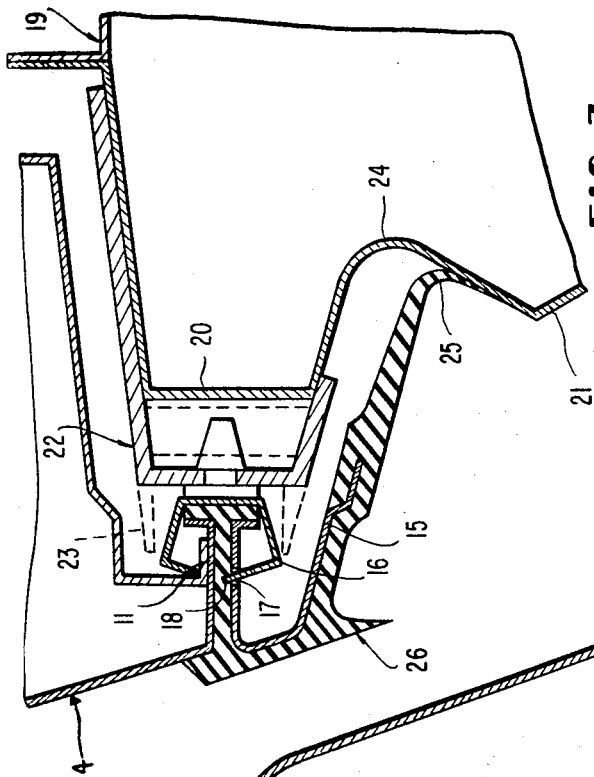
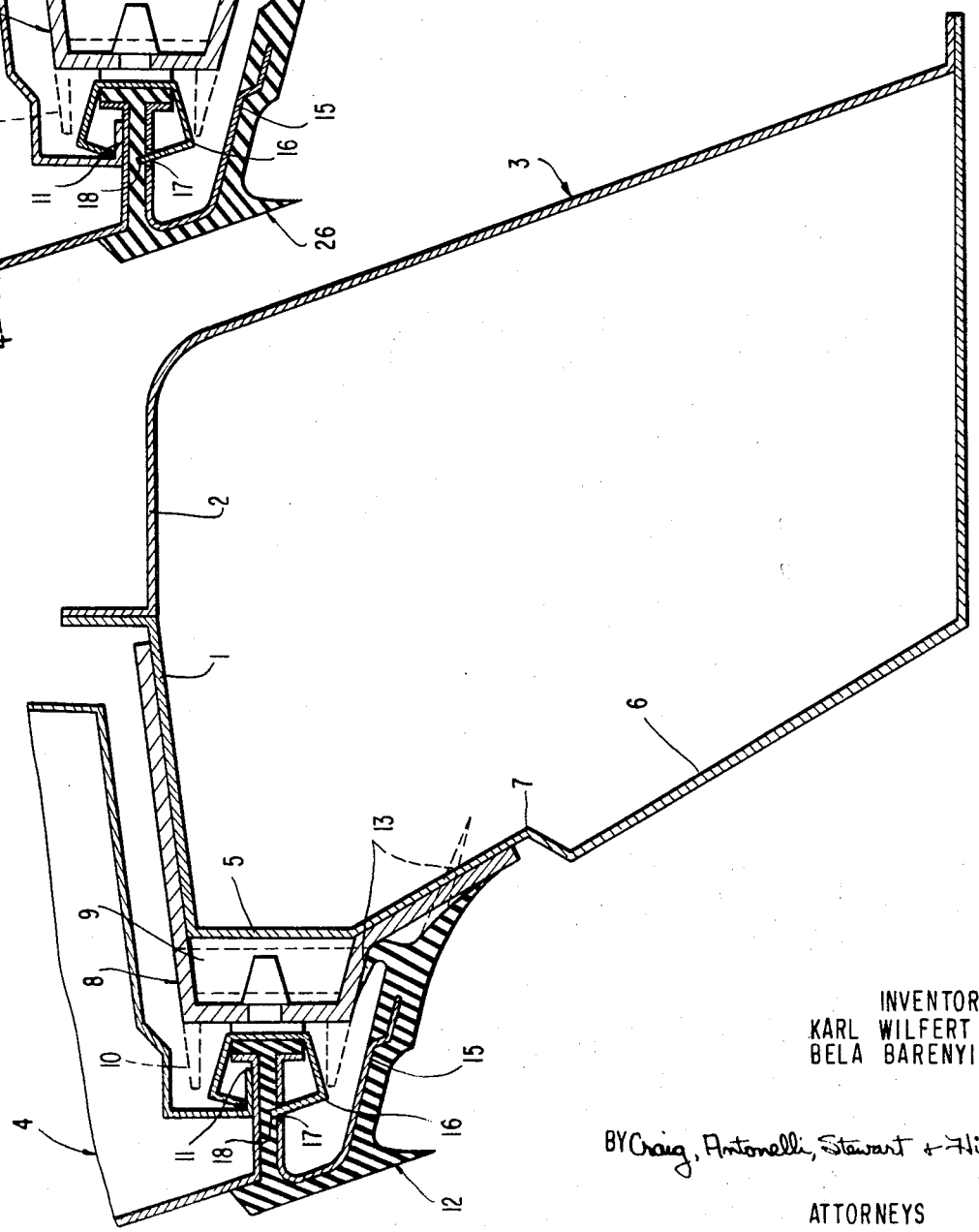
INVENTORS
KARL WILFERT
BELA BARENYI
BY Craig, Antonelli, Stewart & Hill
ATTORNEYS

MOTOR VEHICLE BODY

The present invention relates to a motor vehicle body, especially for passenger motor vehicles, which is provided with laterally arranged doors and longitudinal threshold bearers disposed therebelow.

The outer lateral surfaces of the longitudinal threshold bearers disposed underneath the doors are subjected to strong soiling which may be caused in particular during bad weather by dirt thrown up. This soiling is undesirable because in particular the upper area of the longitudinal threshold bearer is not effectively included or covered as a rule during vehicle washing by reason of the door edges disposed in front thereof and may give rise to soiling in the vehicle interior and to dirtying of the legs of the passengers during ingress and egress.

The present invention is, therefore, concerned with the task to provide a construction of the aforementioned type, by means of which a soiling of the outer threshold bearer surfaces is prevented within the boarding area. The present invention essentially consists in that the upper area of the outer lateral surfaces of the longitudinal threshold bearer considerably projects outwardly beyond the lower area and is at least partially covered by the door. It is achieved thereby that the upper outer edge of the longitudinal threshold bearer is far-reachingly kept free from soiling because the edge, on the one hand, is disposed outside of the area of the dirt thrown up from below and, on the other, is additionally protected against soiling by the door.

It is advantageous if the upper area of the lateral surface of the longitudinal threshold bearer extends approximately vertically whereas the lower area rises obliquely outwardly. The soiling can be partially prevented already by such measure because the upper area of the outer lateral surface is no longer exposed to the same strong extent to the thrownup or whirled-up dust and is covered by the lower area.

According to a further development of the present invention, the upper area of the lateral surfaces of the longitudinal threshold bearer may be covered off at least over a portion of its length by means of an elastic profile member. It is thereby advantageous if the profile member has a U-shaped cross section open toward the outside. Provision may thereby be made advantageously that the lower door fold engages into the U-shaped profile.

In order to avoid that the dirt present along the lower area of the lateral surfaces of the longitudinal threshold bearer moves during the drive into the upper area, a groove-shaped recess may be provided below the upper area of the lateral surface of the longitudinal threshold bearer. The upwardly flowing or migrating dirt collects in this groove-shaped recess and is conducted away.

According to a further development of the invention, the door may be extended downwardly by means of a profile member of rubber or synthetic resinous material, which abuts at the longitudinal threshold bearer. A still better protection of the upper lateral surfaces of the longitudinal threshold bearer against soiling can be achieved thereby. It is particularly advantageous in connection therewith if the profile member of the door is provided preferably with upwardly and downwardly directed sealing lips. An absolute seal can be achieved with such arrangement which is effective in the upward and downward direction. Advantageously, the profile member of the door with the sealing lips may engage in the groove-shaped recess of the longitudinal threshold member.

It is structurally advantageous if the profile member is secured at the lower door fold by means of clamps or the like. A reinforcing profile member consisting preferably of lightweight metal may be additionally provided in that case for the profile member of the door.

Accordingly, it is an object of the present invention to provide a vehicle body which avoids by simple means the aforementioned shortcomings and drawbacks encountered in the prior art.

Another object of the present invention resides in a motor vehicle body which effectively minimizes the danger of soiling within the area of ingress and egress of a vehicle door.

A further object of the present invention resides in a motor vehicle body which precludes a soiling of the lateral surface portions of the longitudinal threshold bearers.

These and further objects, features and advantages of the present invention will become more obvious from the following description when taken in connection with the accompanying drawing which shows, for purposes of illustration only, two embodiments in accordance with the present invention and wherein:

FIG. 1 is a partial transverse cross-sectional view through a motor vehicle body construction in accordance with the present invention, taken within the area of a door;

FIG. 2 is a perspective of an individual part of FIG. 1; and

FIG. 3 is a partial transverse cross-sectional view through a modified embodiment of a motor vehicle body in accordance with the present invention, again taken within the area of the door.

Referring now to the drawing wherein like reference numerals are used throughout the various views to designate like parts, and more particularly to FIG. 1, a longitudinal threshold bearer generally designated by reference numeral 3 of a passenger motor vehicle (not shown) is illustrated in this figure which is composed of sheet metal plate members 1 and 2 assembled into a hollow profile. The longitudinal threshold bearer 3 is arranged below a door generally designated by reference numeral 4. The upper area 5 of the outer lateral surface of the longitudinal threshold bearer 3 projects considerably over the lower area 6 in the outward direction. The upper area 5 of the lateral surface of the longitudinal threshold bearer 3 extends approximately vertically whereas the lower area rises obliquely outwardly. Additionally, a groove-shaped recess 7 is provided underneath the upper area 5 of the lateral surface of the longitudinal threshold bearer 3.

The upper area 5 of the lateral surface of the longitudinal threshold bearer 3 is additionally covered off at least over a part of its length by means of a profile member generally designated by reference numeral 8 which corresponds to the boarding area of the door opening. This profile member 8 is made of elastic material, for example, of rubber or synthetic resinous material, and possesses a hollow space 9 within the upper area 5 of the lateral surface of the longitudinal threshold bearer 3, with respect to which its outer surface extends parallel. Appropriately, this profile member 8 has a U-shaped cross section 10 open toward the outside as indicated in dash line in FIG. 1. The door fold 11 engages into this outwardly open U-shaped cross section 10, by means of which the upper area 5 of the lateral surface of the longitudinal threshold bearer 3 is partially covered.

In order to achieve a further sealing of the upper area 5 of the lateral surface of the longitudinal threshold bearer 3, the door 4 is extended downwardly by means of a profile member generally designated by reference numeral 12 made from elastic material, for example, rubber or synthetic resinous material. This profile member 12 includes upwardly and downwardly directed sealing lips 13 and 14, by means of which it abuts at the lateral surface of the longitudinal threshold bearer 3 or at the profile member 8 of the longitudinal threshold bearer 3. The profile element 12 secured at the door 4 includes an insert or reinforcing profile element 15 made from light metal. The reinforcing profile element 15 and the elastic profile member 12 of the door 4 are secured at the lower door fold 11 by means of one or several elastic clamps 16 which surround the T-shaped end of the profile member 12 and the door fold 11. Apertures 17 are additionally provided in the reinforcing profile element 15 into which engage the clamps 16 with the nose portions 18 thereof, illustrated on a larger scale in FIG. 2, which represents a perspective view of such a clamp 16.

FIG. 3 illustrates a similar construction of a longitudinal threshold bearer generally designated by reference number 19 and of a door 4 of a passenger motor vehicle. Also in this case the upper area 20 of the lateral surface of the longitudinal threshold bearer 19, which extends approximately vertically, projects considerably beyond the lower area 21 in the outward direction. Furthermore, at least over a portion of the length of the longitudinal threshold bearer 19 the upper area 20 of the lateral surface is covered off by means of a profile member generally designated by reference numeral 22 which, as indicated in dash line, may have an outwardly open U-shaped cross section 23. A very deep groove-shaped recess 24 is provided between the upper area 20 and the lower area 21 of the lateral surface of the longitudinal threshold bearer 19, into which directly engages a downwardly extending sealing lip 25 of an elastic profile member 26 made from rubber or synthetic resinous material which is secured as extension of the door 4 at the bottom thereof. This profile member 26 is also provided with a reinforcing profile element 15 and is secured at the lower door fold 11 by means of clamps 16 or clips or the like.

While we have shown and described only two embodiments in accordance with the present invention, it is understood that the same is not limited thereto, but is susceptible of numerous changes and modifications as known to those skilled in the art. For example, it is also feasible within the scope of the present invention to provide a similar construction, for example, at rear doors, if soiling is to be avoided thereat.

Thus, it is obvious that the present invention is not limited to the details shown and described herein and we, therefore, do not wish to be limited thereto, but intend to cover all such changes and modifications as are encompassed by the scope of the appended claims.

We claim:

1. A motor vehicle body construction, especially for passenger motor vehicles, comprising:
   passenger door means arranged on at least one lateral side of the vehicle,
   longitudinally extending bearer means of hollow beam construction extending underneath said door means,
   an upwardly facing substantially horizontal surface portion of said bearer means forming doorsill means for said door means,
   the laterally outwardly facing side of said bearer means having an uppermost portion extending approximately vertically and a lowermost portion tapering inwardly in the downward direction toward the center of the vehicle, said uppermost and lowermost portion being joined by a groove-shaped recess open toward the outside, the innermost part of said recess being spaced inwardly of the outermost part of said lowermost portion, and
   a sealing profile means attached to the lower portion of said door means, said sealing profile means including means sealingly engaging the outwardly facing side of said bearer means within said recess when the door is closed, whereby soiling of the uppermost portion during driving of the vehicle is prevented and whereby upwardly flowing dirt on the lowermost portion is conducted away by said recess during driving of the vehicle.

2. A construction according to claim 1, wherein the outermost part of said lowermost portion is spaced laterally inwardly of the uppermost portion.

3. A construction according to claim 2, wherein said recess is formed with straight side walls.

4. A construction according to claim 2, wherein said recess is formed with curved side walls.

5. A construction according to claim 1, wherein said sealing profile means is constructed of elastic material.

6. A construction according to claim 5, wherein said sealing profile means includes only a single sealing lip portion for sealingly engaging a lower part of said recess.

7. A construction according to claim 5, wherein said sealing profile means includes an upwardly extending sealing lip portion for sealingly engaging an upper part of said recess and a downwardly extending sealing lip portion for sealing engaging a lower part of said recess.

8. A construction according to claim 7, wherein the outermost part of said lowermost portion is spaced laterally inwardly of the uppermost portion.

9. A construction according to claim 7, characterized in that said sealing profile means is secured at a lower door fold by clamping means.

10. A construction according to claim 7, characterized in that a reinforcing profile means is provided for said sealing profile means.

11. A construction according to claim 10, characterized in that said reinforcing profile means consists of light metal.

12. A construction according to claim 11, characterized in that said sealing profile means is secured at a lower door fold by clamping means.

13. A construction according to claim 1, wherein a profile member is attached to said bearer means along at least a portion of the length of the bearer means, said profile member covering parts of said upwardly facing surface portion and of said outwardly facing side.

14. A construction according to claim 13, characterized in that said profile means has an outwardly open U-shaped cross section elastic portion.

15. A construction according to claim 14, characterized in that the door means includes a lower door fold which engages into the U-shaped portion when the door means is closed.

16. A construction according to claim 13, wherein said sealing profile means is constructed of elastic material.

17. A construction according to claim 16, wherein said sealing profile means includes an upwardly extending sealing lip portion for sealingly engaging an upper part of said recess and a downwardly extending sealing lip portion for sealing engaging a lower part of said recess.

18. A construction according to claim 17, wherein said profile member extends downwardly into said recess, and wherein said upwardly and downwardly extending lip portion directly engages said profile member with the door in a closed condition.

19. A construction according to claim 18, wherein the outermost part of said lowermost portion is spaced laterally inwardly of the uppermost portion.

20. A construction according to claim 13, wherein said profile means has an outwardly open U-shaped cross-section elastic portion which faces outwardly from immediately adjacent said uppermost portion of the side of the bearer means, and wherein the door means includes a lower door fold which engages into the U-shaped portion when the door is closed.

21. A construction according to claim 20, wherein said sealing profile means is clamped to said lower door fold by clamping means, said clamping means being positioned within said U-shaped portion with a closed door.

22. A construction according to claim 21, wherein said clamping means includes an upper resilient part directly engaging an upwardly facing surface of said door fold and a lower resilient part directly engaging said sealing profile means to clamp said sealing profile means against a downwardly facing surface of said door fold.

23. A construction according to claim 22, wherein said sealing profile means includes only a single sealing lip portion for sealingly engaging a lower part of said recess.

24. A construction according to claim 23, wherein the outermost part of said lowermost portion is spaced laterally inwardly of the uppermost portion.

25. A construction according to claim 23, wherein said sealing lip means engages said recess at a position below the lowermost extent of said profile member.

26. A construction according to claim 22, wherein said sealing profile means includes an upwardly extending sealing lip portion for sealingly engaging an upper part of said recess and a downwardly extending sealing lip portion for sealing engaging a lower part of said recess.

27. A construction according to claim 26, wherein the outermost part of said lowermost portion is spaced laterally inwardly of the uppermost portion.

28. A construction according to claim 26, wherein said profile member extends downwardly into said recess. and wherein said upwardly and downwardly extending lip portion directly engages said profile member with the door in a closed condition.

* * * * *